(12) United States Patent
Swope et al.

(10) Patent No.: US 6,615,136 B1
(45) Date of Patent: Sep. 2, 2003

(54) METHOD OF INCREASING LOCATION ACCURACY IN AN INERTIAL NAVIGATIONAL DEVICE

(75) Inventors: Charles B. Swope, Coral Springs, FL (US); Daniel A. Tealdi, Hialeah, FL (US); Patrick Douglas Koskan, Lake Worth, FL (US)

(73) Assignee: Motorola, Inc, Schaumburg, IL (US)

( * ) Notice: Subject to any disclaimer, the term of this patent is extended or adjusted under 35 U.S.C. 154(b) by 0 days.

(21) Appl. No.: 10/078,796

(22) Filed: Feb. 19, 2002

(51) Int. Cl.[7] .............................................. G01C 21/26
(52) U.S. Cl. ...................... 701/214; 701/208; 340/995
(58) Field of Search ................................. 701/214, 208, 701/200, 220, 210; 340/995

(56) References Cited

U.S. PATENT DOCUMENTS 5,781,156 A    7/1998   Krasner ................. 342/357.17

2002/0062193 A1 *  5/2002  Lin ............................. 701/208
2002/0116125 A1 *  8/2002  Lin ............................. 701/214

* cited by examiner

Primary Examiner—Marthe Y. Marc-Coleman
(74) Attorney, Agent, or Firm—Terri S. Hughes

(57) ABSTRACT

A method of increasing location accuracy in an inertial navigational device (100) is described herein. The navigational device (100) generates real-time data to depict its location. The data comprises at least one of sensor data, motion data, and location data. The navigational device (100) transmits the real-time data to a second device (104) in a real-time fashion. The navigational device (100) receives an update message from the second device (104), based on a comparison of the real-time data generated by the navigational device (100) against a second set of data. The navigational device (100) adjusts its depicted location based on the update message in order to increase the location accuracy of the navigational, device (100). Alternatively, the navigational device (100), absent the second device (104), can compare the real-time data generated against the second set of data internally and adjust its depicted location accordingly.

21 Claims, 2 Drawing Sheets

METHOD OF INCREASING LOCATION ACCURACY IN AN INERTIAL NAVIGATIONAL DEVICE

REFERENCE TO RELATED APPLICATION

The present application is related to the following U.S. application commonly owned together with this application by Motorola, Inc.: Ser. No. 10/078,738, filed Feb. 19, 2002, titled "Device for Use With A Portable Inertial Navigation System (PINS) and Method For Processing PINS Signals" by Swope, et al.

FIELD OF THE INVENTION

The present invention relates generally to a method if increase location accuracy in an inertial navigation device.

BACKGROUND OF THE INVENTION

A traditional inertial navigation system ("INS") in its embodiment utilizes accelerometers, gyroscopes, and support electronics, such as a processor, in order to translate sensor data into motional changes. These changes are then translated to position based on an initial referenced position and the integration or differentiation of said motion. As time progresses, the errors associated with the accelerometers and gyroscopes increase to a point where the translation to position is outside of the required positional resolution, thus rendering the unit ineffective or lost.

In one INS embodiment, the INS device is updated manually by resetting the INS device using a known fixed position or by returning back to the original reference position. The user manually resets the INS unit and positional errors are cleared until said error occurs again requiring another reset.

In another embodiment the INS device is updating an alternate location-finding unit, such as a global positioning system ("GPS"). In this configuration, the attached GPS is providing data to a communication link sending back Latitude and Longitude information. The INS device is utilized when the GPS position is no longer available due to occulting of the satellites. The INS device is utilized to provide updates to the last known position and errors are accumulated at a rate of 2% to 5% of the distance traveled. The INS device is only used for updating the embedded GPS unit's location. Once a GPS signal is re-captured, the INS device is not used.

Traditionally, INS devices utilize output voltages representing the second derivative of position to integrate and determine relative changes in motion. These are applied to the last known position update and a new one is generated with some small error. As time progresses, the errors are accumulated and the computed position is no longer usable by the INS user. A known location or position is required in order to correct for the errors. Traditional systems utilize GPS, or cycle through a fixed reference point to correct those errors.

Thus, there exists a need for a system that reduces error accumulation and performs stand-alone tracking in areas where GPS (or other similar location technologies) can no longer provide location updates to the user or infrastructure.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

The present invention increases location accuracy in a Portable Inertial Navigation System ("PINS"). A PINS performs stand-alone tracking in areas where a Global Positioning System ("GPS"), or other similar location technologies, can no longer provide location updates to the user or infrastructure. Ideally, a user can carry a PINS device so that gestures (i.e., body movements) are translated into position or location. Preferably, PINS utilizes internal three-axis gyroscopes and accelerometers (and other technology) to capture the motion of the user and translates it into positional changes through algorithmic processing. The processing can occur in the PINS device, the host or base computer, or any combination of both. Thus, the present invention maintains a high level of positional accuracy for users as they traverse through areas where traditional radio frequency ("RF") triangulation is not possible, such as an indoor structure, heavy foliage, urban canyons, etc.

Figure 1:
FIG. 1 illustrates a block diagram of the portable inertial navigation system ("PINS") architecture in accordance with the preferred embodiment of the present invention.

In accordance with the present invention, the PINS technology is coupled with traditional communication devices (e.g., two-way radios) to provide a link to the host. The host then tracks the location of the PINS device by correlating motion history against a dimensional rendering of a structure or building. In order to accommodate this task, the following details the architectural designs for the two primary components in the PINS architecture: the PINS device 100 and the host 104; these two components are connected via an over-the-air radio channel 102 as illustrated in FIG. 1.

Figure 2:
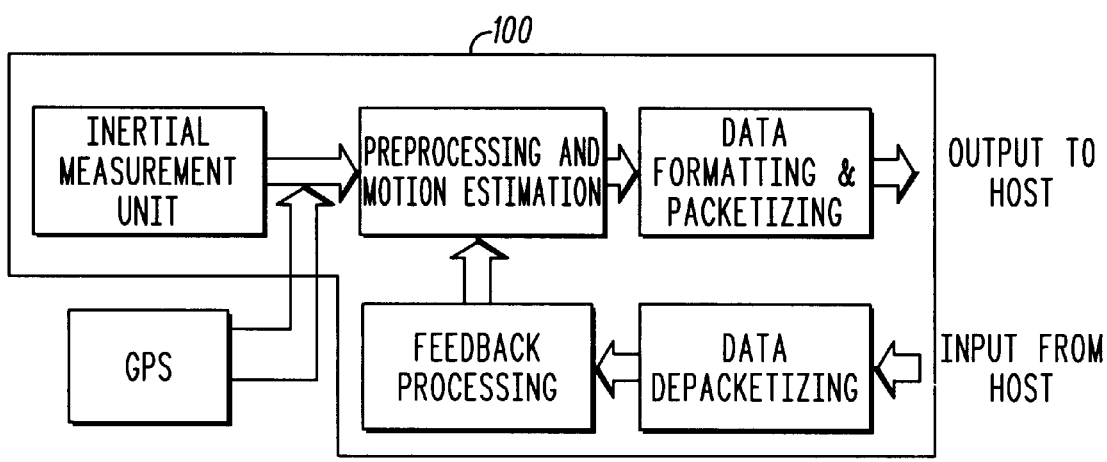
FIG. 2 illustrates a block diagram of a PINS device in accordance with the preferred embodiment of the present invention.

As illustrated in FIG. 2, the PINS device 100 is responsible for taking measurements of motion-related data (e.g., acceleration, rotation, direction), and translating this data into motion commands through sensor signal processing. The motion-related data is then transmitted to the host that identifies the location of the PINS device to those requiring resource tracking.

In the preferred embodiment, the PINS device 100, also referred to as an inertial measurement unit ("IMU"), receives an initialization function (e.g., GPS) to provide an initial position for the PINS device that allows it to utilize its relative metrics and convert them into an error correction (e.g., a location update). Although a GPS provides the initial location to the PINS device in the preferred embodiment, it is not necessary. Since PINS utilizes a communication infrastructure, a simple voice position update, or the like, will suffice as the initialization function.

The PINS device 100 consists of a host of sensors and required processing power to pre-process the raw data from the inertial sensors. There are several different sensors that can be used in an IMU. Theses sensors include, but are not limited to, accelerometers, gyroscopes, compass, pressure, and temperature.

The PINS device 100 is responsible for gathering the necessary data to determine location. Measuring the several degrees of freedom of an object to arrive to the desired location information usually does this. An object has six degrees of freedom in space; three of them determine the position, while the other three determine the altitude of the object. The three linear axes determine the position: x, y, and z; the three rotational axes determine the altitude: theta (pitch), psi (yaw), and phi (roll).

The PINS device 100 is responsible for measuring these variables that are necessary to track an object in three dimensions. These six axes are usually measured indirectly through their first or second moments. For example, theta, psi, and phi are derived through the measurement of their first moment or angular velocity rather than angular position; x, y, and z are usually measured through their second moment or linear acceleration rather than linear position. Thus, the PINS device 100 relies on the motion of the object in order to determine its position.

The PINS device 100 can be designed to output at least one type of data, such as sensor data, motion commands, position location, and/or the like. The radio channel 102 is responsible for sending the output data of the PINS device 100 over-the-air to the host 104, typically residing at the base or dispatcher station. This communication is bi-directional, meaning that not only is data for the PINS device 100 sent to the host 104, but the host 104 also must be able to send correction data/messages back to the PINS device 100 for error correction(s).

Figure 3:
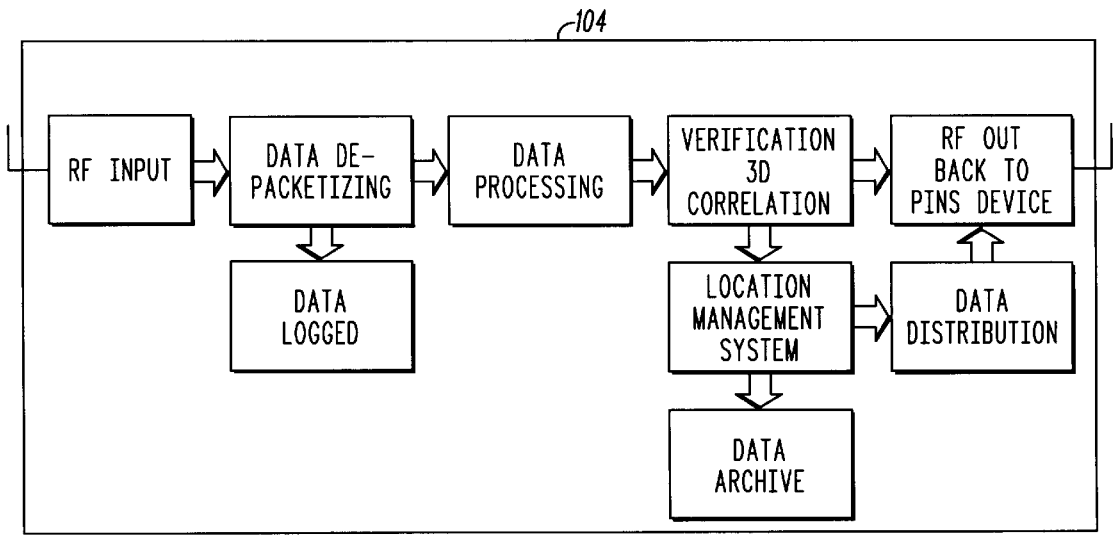
FIG. 3 illustrates a block diagram of a host in accordance with the preferred embodiment of the present invention.
Figure 4:
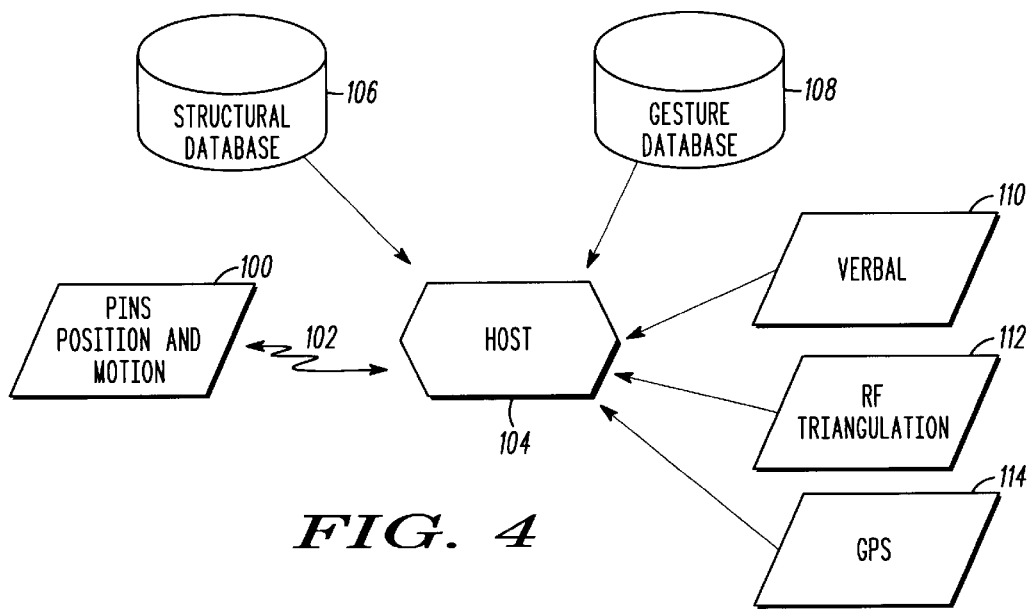
FIG. 4 illustrates a software components diagram for the host process in accordance with the preferred embodiment of the present invention.

As illustrated in FIGS. 3 and 4, the host 104 is responsible for receiving the over-the-air data packets from the PINS device 100; this data is logged and formatted for processing by the host 104. The data collected can now be augmented with other location data, if available, such as RF triangulation 108 or a GPS fix 109, in order to get a better estimate of the actual location of the PINS user. The estimated location can be further corrected by using a verification process; this process may involve correlation with dimensional building structure information 105, reference gestures information 106, dispatcher update using voice query information with the user 107, and/or the like.

Once the data has been processed and the location correction coefficient is determined, it is sent back to the PINS device 100 via the radio channel 102 for error corrections and user visualization if applicable (such as a heads-up display). This data enables the PINS device 100 to correct itself to drift errors, and also serve as an indication to the user of where the host/system considers him to be. On the host side, the location management software handles the data and can keep track of the location of several different PINS devices. The host 104 is responsible for archiving, displaying, and distributing this location data back to the PINS device 100. Remote client units, using various wireless networks, can also receive the location data.

The following is a process operational flow of how a PINS device 100 could be used in the field. First, the PINS device 100 is initialized with a known reference location (such as that provided by a GPS, a voice command, or the like). Next, the PINS device 100 gathers sensor data and calculates motion commands and position location from the sensor data. The PINS device 100 sends the motion commands and position locations to the host 104. The host 104 uses the position location of the PINS device and further correlates the received location and received motion commands with other available non-location data (such as, but not limited to, verbal communication from the user, structural dimensions, reference gestures, sensor metrics, and/or the like) in order to enhance the resolution of the reported location by calculating any coefficients. In the preferred embodiment, once the coefficients are calculated, the host 104 sends the coefficients to the PINS device 100. Upon receipt, the PINS device 100 re-initializes its current location based on the processing of coefficients and further makes necessary modifications to the process of calculating subsequent motion commands and position locations.

It should be noted that in the preferred embodiment of the present invention, the PINS device 100 is updated such that no GPS or external fixed or manual reference is necessary at the PINS device to reduce or eliminate accumulated position errors. This is accomplished by the host 104 receiving or having access to information other than the data received from the PINS device 100, such as dimensions of the structure where the PINS device 100 is being used and/or reference gestures. The host 104 identifies key update locations that are unique enough for establishing a reference location (such as stairs, elevators, and hallways). As the PINS user moves, the updated motion commands provide the host 104 with a probable location of the user. Again, as time progresses, the PINS device 100 accumulates errors when gathering data and creating motion commands. The host 104, however, eventually will detect the occurrence of one of the reference locations and infer where the PINS user is located; once the error is detected and corrected, it is sent to the PINS device 100 for correction. Hence, the accuracy can be improved without any intervention from the user.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method of increasing location accuracy in an inertial navigational device comprising the steps of:

generating real-time data to depict a location of the inertial navigational device, wherein the data comprises at least one of sensor data, motion data, and location data;

transmitting the real-time data generated by the inertial navigational device in a real-time fashion to a second device;

receiving an update message at the inertial navigational device from the second device, wherein the update message is compiled at the second device based on a comparison of the real-time data generated by the inertial navigational device against a second set of data; and adjusting the depicted location of the inertial navigational device based on the update message in order to increase the location accuracy of the inertial navigational device.

2. The method of claim 1 wherein the second set of data is collected off-line.

3. The method of claim 1 wherein the second set of data is based on output from a positioning system.

4. The method of claim 1 wherein the second set of data is a collection of gestures that was collected in a given sequence and stored in a database that reflects movements in a structure.

5. The method of claim 4 wherein the given sequence of the collection of gestures is either simulated, emulated, or actual gesture sequences that reflect movement in the structure.

6. The method of claim 1 wherein the second set of data is a dimensional model of a given structure.

7. The method of claim 6 further comprising the steps of:
displaying the dimensional model of the given structure on a graphical user interface associated with the inertial navigational device; and
displaying an indicator of the depicted location of the inertial navigational device in relation to the dimensional model.

8. A method of increasing location accuracy in an inertial navigational device comprising the steps of:
generating real-time data to depict a location of the inertial navigational device, wherein the real-time data comprises at least one of sensor data, motion data, and location data;
comparing the real-time data against a second set of data; and
in response to the step of comparing, adjusting the depicted location of the inertial navigational device in order to increase location accuracy of the inertial navigational device.

9. The method of claim 8 wherein the second set of data is collected off-line.

10. The method of claim 8 further comprising the step of retrieving the second set of data from a database.

11. The method of claim 8 further comprising the step of receiving the second set of data from a positioning system in a real-time fashion.

12. The method of claim 8 further comprising the step of, after the step of adjusting, transmitting the depicted location of the inertial navigational device to a second device.

13. The method of claim 8 wherein the second set of a data is a dimensional model of a structure where the inertial navigational device is located, and further comprising the step of displaying the dimensional model of the structure to a graphical user interface associated with the inertial navigational device.

14. The method of claim 8 wherein the second set of data is a collection of gestures that was collected in a given sequence that reflects movements in a structure.

15. The method of claim 8, wherein the location is depicted in three dimensions.

16. A device comprising a processor, which when in operation, causes the device to perform the following functions:
generate real-time data to depict a location of the inertial navigational device, wherein the real-time data comprises at least one of sensor data, motion data, and location data;
compare the real-time data against a second set of data; and
in response to the function of comparing, adjust the depicted location of the inertial navigational device in order to increase location accuracy of the inertial navigational device.

17. The device of claim 16, wherein the location is depicted in three dimensions.

18. A device comprising at least a transmitter, a receiver and a processor, which when in operation, causes the device to perform the following functions:
generate real-time data to depict a location of the apparatus, wherein the data comprises at least one of sensor data, motion data, and location data;
transmit the real-time data generated by the apparatus in a real-time fashion to a second device;
receive an update message at the apparatus from the second device, wherein the update message is compiled at the second device based on a comparison of the real-time data generated by the apparatus against a second set of data; and
adjust the depicted location of the apparatus based on the update message in order to increase the location accuracy of the apparatus.

19. A method of increasing location accuracy in an inertial navigational device comprising the steps of:
generating real-time data to depict a location of the inertial navigational device, wherein the data comprises at least one of sensor data, motion data, and location data;
transmitting the real-time data generated by the inertial navigational device in a real-time fashion to a second device;
receiving an update message from the second device, wherein the update message is compiled based on a comparison of the real-time data generated by the inertial navigational device against a second set of data, wherein the second set of data is a collection of gestures that was collected in a given sequence and stored in a database that reflects movements in a structure; and
adjusting the depicted location of the inertial navigational device based on the update message in order to increase the location accuracy of the inertial navigational device.

20. The method of claim 19 wherein the given sequence of the collection of gestures is either simulated, emulated, or actual gesture sequences that reflect movement in the structure.

21. A method of increasing location accuracy in an inertial navigational device comprising the steps of:
generating real-time data to depict a location of the inertial navigational device, wherein the real-time data comprises at least one of sensor data, motion data, and location data; comparing the real-time data against a second set of data, wherein the second set of data is a collection of gestures that was collected in a given sequence that reflects movements in a structure; and
in response to the step of comparing, adjusting the depicted location of the inertial navigational device in order to increase location accuracy of the inertial navigational device.

* * * * *